United States Patent [19]

Kumm

[11] Patent Number: 4,969,857
[45] Date of Patent: Nov. 13, 1990

[54] VARIABLE SPEED ACCESSORY DRIVE

[75] Inventor: Emerson L. Kumm, Tempe, Ariz.

[73] Assignee: Kumm Industries, Inc., Phoenix, Ariz.

[21] Appl. No.: 416,833

[22] Filed: Oct. 3, 1989

[51] Int. Cl.[5] ............................................. F16H 55/52
[52] U.S. Cl. .......................................... 474/49; 474/52
[58] Field of Search ..................................... 474/49-57

[56] References Cited

U.S. PATENT DOCUMENTS

| | | | |
|---|---|---|---|
| 2,310,081 | 2/1943 | Hill | 474/15 |
| 4,216,678 | 8/1980 | Butterfield | 474/12 |
| 4,295,836 | 10/1981 | Kumm | 474/51 |
| 4,432,743 | 2/1984 | Pitoiset | 474/14 |
| 4,591,351 | 5/1986 | Kumm | 474/49 |
| 4,639,239 | 1/1987 | de Briel | 474/8 |
| 4,714,452 | 12/1987 | Kumm | 474/49 |
| 4,768,996 | 9/1988 | Kumm | 474/49 |
| 4,772,248 | 9/1988 | De Briel | 474/14 |
| 4,810,234 | 3/1989 | Kum | 474/53 X |
| 4,854,921 | 8/1989 | Kumm | 474/49 |

*Primary Examiner*—Thuy M. Bui
*Attorney, Agent, or Firm*—Richard G. Harrer; Charles E. Cates

[57] ABSTRACT

The accessories of a prime mover (such as an engine) are automatically maintained at a more constant speed with varying prime mover speed using a flat belt driving a variable diameter pulley wherein a fixed diameter pulley attached to the variable diameter pulley is used to drive another belt coupled to the accessories.

The variable diameter pulley assembly includes a shaft and a pair of pulley sheaves each having a pair of relatively movably guideway disks with belt engaging elements extending between the pulley sheaves. Mutual angular changes between the guideway disks causes a corresponding change in the effective diameter of the pulley assembly. A speed responsive actuator assembly is employed and includes a housing with at least a pair of springs. The actuator assembly is positioned by a balance of forces including the centrifugal force of the belt drive elements, the compression force of the actuator springs, and the forces due to the belt. One side of the actuator assembly is connected in a preferred embodiment to the outer guideway disks and hence to the shaft while the inner guideway disks are connected to the other side of the actuator assembly. As the engine speed increases, the belt engaging elements move out to a larger radius because of their centrifugal force which increases with the square of the speed. Since the pulley driven at engine speed is normally of fixed diameter, an increased variable pulley diameter causes the variable pulley speed to decrease relative to the engine speed.

6 Claims, 4 Drawing Sheets

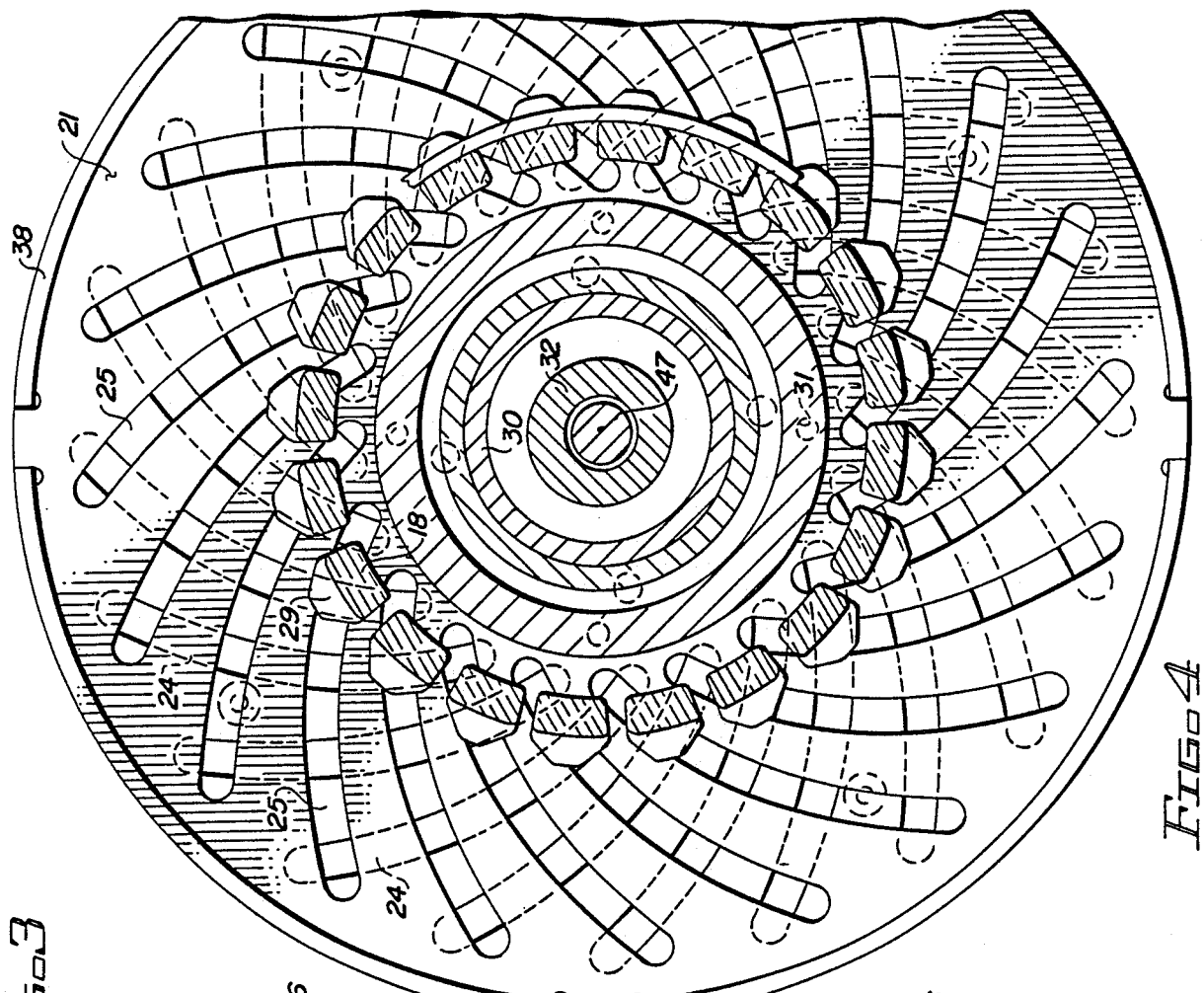
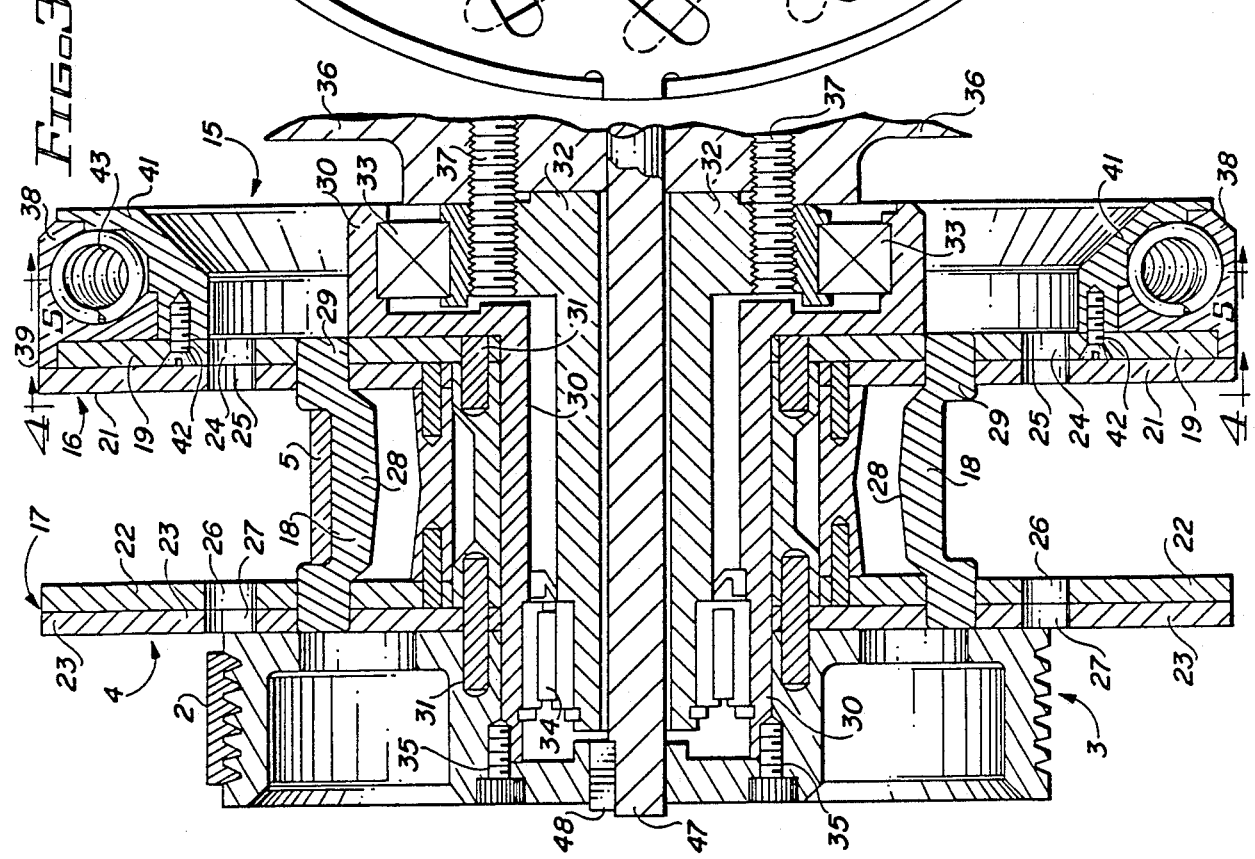

VARIABLE SPEED ACCESSORY DRIVE

FIELD OF THE INVENTION

This invention relates to the engine accessory drive art and, more particularly, to a variable speed accessory drive by which engine-driven accessories, superchargers and other equipment are automatically driven at lower speeds relative to the engine speed as the engine speed is increased.

BACKGROUND OF THE INVENTION

Internal combustion engines typically drive several accessories through a belt arrangement operating off the engine crankshaft. For example, an exemplary vehicle engine might drive such accessories as: an air pump, alternator, fan, air conditioning compressor, power steering pump and a water pump. A well recognized problem with such accessories as conventionally belt driven is that their rate of rotation is proportional to engine speed. Consequently, the designs of the accessories have been subject to substantial compromise in order to insure adequate performance at low engine speeds and dependability and reasonable longevity at high engine speeds. In recognition of these contradictory requirements, it has been proposed in the past that a variable speed accessory drive be employed which would serve to drive the accessories relatively faster at lower engine speeds and relatively slower at higher engine speeds. Also, the engine drive supercharger has a similar need for being driven relatively slower at higher engine speeds for a better match to the engines air flow requirements.

If such an effective variable speed accessory and supercharger drive can be realized, numerous benefits would be obtained. For example: the life of the accessory bearings would be greatly extended, power absorption at high speed would be greatly reduced such that more net power output of the engine would be available, fuel economy would be improved, better accessory performance at low engine speeds (such as idle) would be obtained, smaller accessories could be employed with resulting savings in initial cost and weight would be realized.

In the variable speed accessory drives which have been proposed in the past, most have employed V-belt drives in which the driving and/or driven pulley is rendered variable in diameter by axially adjusting (under the influence of some speed responsive control system) the pulley sheave facing sections in order that the V-belt will ride at various depths in the variable diameter pulley. The fixed positions of the driving and driven pulley axes together with the fixed belt length results in the belt being tensioned and positioned radially in one of the driving or driven pulleys in an inverse fashion to the other of the driving or driven pulleys in a manner well known to the designers of such variable speed drives. In U.S. Pat. No. 2,310,081 the centrifugal force of balls is used to change the effective belt radius in a V-belt pulley to drive an automobile generator at a more constant speed. In U.S. Pat. No. 4,216,678 cams and cam followers operated upon by centrifugal weights are used to vary the speed ratio of two V-belt pulleys with change in driven speed. In U.S. Pat. Nos. 4,432,743 and 4,639,239 centrifugal weights on diaphragm springs vary the speed ratio of two V-belt pulleys with a change in driven speed. Another U.S. Pat. No. 4,772,248, discloses a construction which uses fluid pressure to act in one V-belt pulley to change the speed ratio with the other pulley using a diaphragm spring. Thus it will be seen that all of the foregoing variable speed systems employ V-belt pulley sheaves which move axially to effect a radial change in the position of the V-belt. V-belts are composed of various compositions and have a trapezoidal cross section, the belt transmitting rotary motion at one speed from the engine to each accessory at another speed, the speed ratio being varied in a continuous or step-wise fashion from a minimum to a maximum as dependent on the geometry of the belt and the pulley system. It has been found that there are significant practical drawbacks to such an arrangement. The control and actuating systems may be complex, expensive and do not enjoy longevity. The V-belt is compressed between smooth, conical sheave sections in the driving pulley by external axial forces acting on the sections to apply compression to the belt and friction between the sides of the belt in the sheave sections to prevent slippage. In operation, a force unbalance caused by changes in the axial loading of the sheave sections causes the V-belt to change its radial positions in the driving pulley until a force balance is achieved or a limit range stop is reached.

For a large transmitted torque, the required axial forces exerted on the driving pulley sheave sections result in large compressive forces on the V-belt which requires that the belt have a substantial thickness to prevent its axial collapse or failure. This increase in thickness increases the belt's centrifugal force and causes higher belt tension load. In addition, as the belt thickness increases, the pulley size must be increased due to higher stress loads at a given design minimum pulley radius. Further, the typical V-belt must continuously "pull out" from the compressive sheave load on leaving the variable diameter pulleys resulting in significant friction losses and belt fatigue which adversely affects the overall efficiency of the system and the operating life of the belt. Consequently, although variable speed pulley drives have successfully used V-belts in a wide range of applications, they have been severely limited in their power capabilities for more competitive smaller size equipment.

Thus, it is to a variable speed accessory and supercharger drive which overcomes these and other problems of the prior art systems to which my invention is directed.

OBJECTS OF THE INVENTION

Consequently, it is a broad object of my invention to provide an improved engine accessory and supercharger drive.

It is a more particular object of my invention to provide a variable speed accessory and/or supercharger drive in which the accessories and/or supercharger are driven faster at lower engine speeds and slower at higher engine speeds, in each case relative to engine speed.

It is a still more specific object of my invention to provide such a variable speed accessory and/or supercharger drive which employs a flat belt in conjunction with a variable diameter flat belt pulley drive from a pulley coupled to the engine crankshaft, said driven flat belt pulley driving the engine accessories and/or supercharger at a more constant speed ratio using another belt and other integral pulley.

It is a still yet more specific object of my invention to provide such a variable speed accessory and/or supercharger drive in which the flat belt variable diameter pulley assembly includes an integral spring controlled actuator for effecting a change in diameter automatically in combination with a belt length take up tensioner.

Another object of my invention is to provide, when desired, a simple control that modifies the automatically scheduled speed ratio between the engine and the driven accessories.

SUMMARY OF THE INVENTION

Briefly, these and other objects of my invention are achieved by the use of a flat belt coupling a variable diameter driven pulley assembly to an engine operated pulley of fixed diameter using a force operated tensioner for belt length takeup. The flat belt variable diameter pulley shaft supports and drives a fixed diameter pulley whose belt is coupled to pulleys of the various engine accessories and/or superoharger. The variable diameter pulley assembly includes a shaft and a pair of pulley sheaves each of the sheaves including a pair of relatively movable guideway disks lying alongside each other in juxtaposition. An inner guideway disk of each pair includes a first series of spiral guideways extending in one direction while an outer guideway disk of each pair includes a second series of spiral guideways extending in the opposite direction such that the guideway intersections capture and locate bearing ends of a circumferential array of belt engaging elements extending between the pulley sheaves. The inner guideway disks are locked together, and the outer guideway disks are locked together such that mutual angular change between the inner and outer guideway disks causes corresponding change in the radial positions of the belt engaging elements and hence the effective diameter of the pulley assembly With one of the guideway disk sets coupled to the shaft, the action may be made responsive to the engine speed by providing a spring means for adjusting the angular relationship between the inner and outer guideway disk sets. In one preferred embodiment, the integral speed responsive actuator assembly is incorporated into the pulley assembly and includes a housing with at least a pair of springs. The actuator assembly is positioned by a balance of forces including the centrifugal force of the belt drive elements, the compression force of the actuator springs, and the forces due to the belt. One side of the actuator assembly is connected in a preferred embodiment to the outer guideway disks and hence to the shaft while the inner guideway disks are connected to the other side of the actuator assembly. As the engine speed increases, the belt drive elements move out to a larger radius because of their centrifugal force which increases with the square of the speed. Since the pulley driven at engine speed is normally of fixed diameter, an increased variable pulley diameter causes the variable pulley speed to decrease relative to the engine speed. In variant configurations, the driving flat belt pulley may be variable in diameter using various actuation systems thus eliminating the belt length takeup tensioner. In other variant configurations, two or more variable diameter flat belt power transmitting pulleys may be used and operated on by the same belt driven by a fixed diameter pulley. In still another variant configuration, the flat belt may drive the variable diameter pulley as well as one or more power transmitting pulleys of fixed diameter all from one drive pulley. In a still further variant, the variable diameter flat belt pulley may be rigidly mounted yet provide a rotating shaft to drive an accessory while transmitting power to other accessories using an attached fixed diameter pulley. In yet another variant the belt take up tensioner may be varied in tension by an actuator to change the belt tension and the operating radius of the variable driven pulley.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 3 is a cross section of a variable diameter pulley assembly incorporating control structure for effecting a change of effective diameter in accordance with its rotational speed;

FIG. 4 is a cross sectional view taken along the lines 4—4 of FIG. 3; and

DETAILED DESCRIPTION OF THE INVENTION

In the discussion of an exemplary embodiment of the invention which follows, emphasis is placed on a configuration in which only one driven pulley of a belt driven engine accessory system is variable in diameter It will be understood, however, that one or more of a system's driven pulleys can be rendered variable diameter by employing essentially the same structure and the driving pulley may or may not be variable in such a system.

Figure 1:
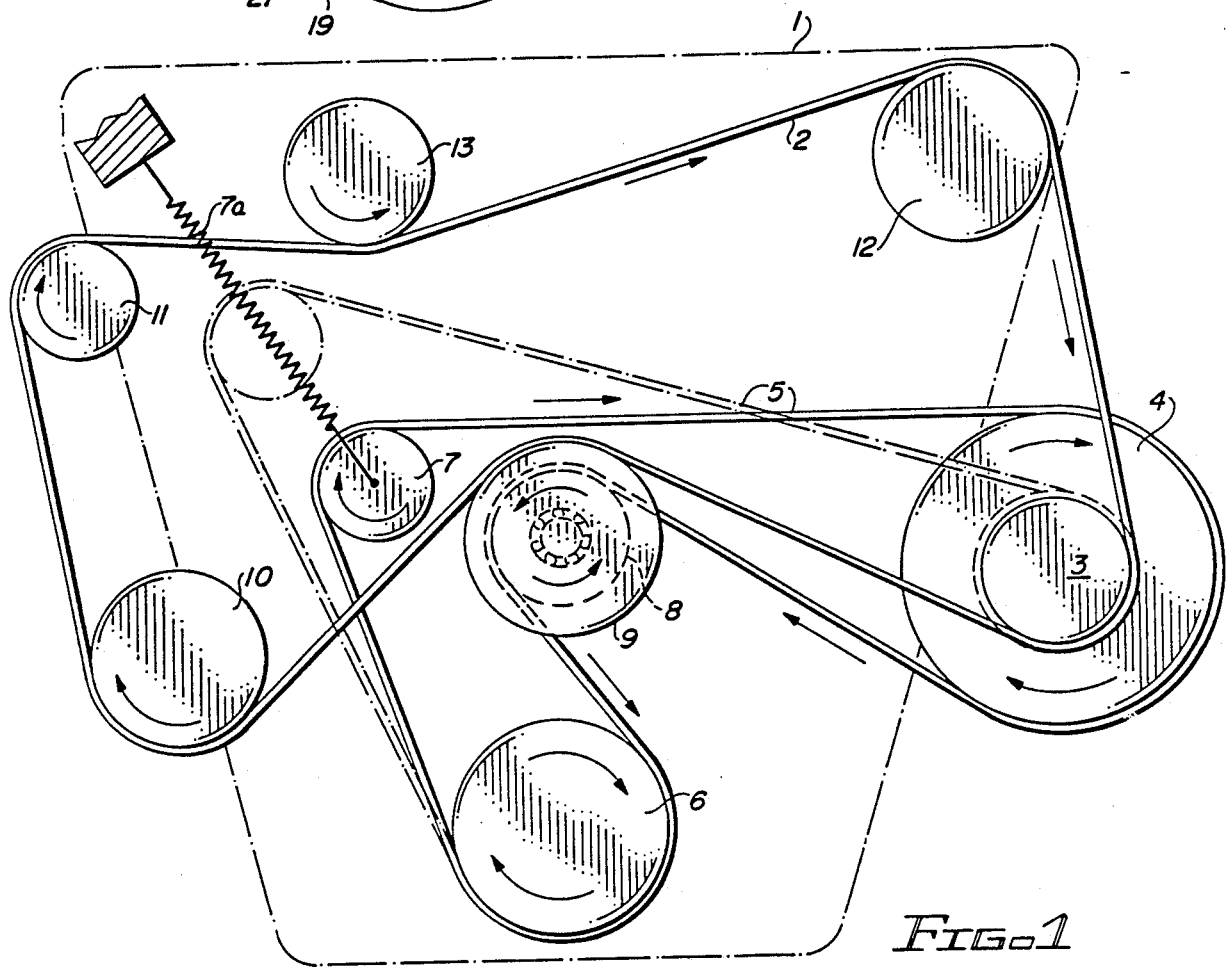
FIG. 1 is a generalized view representing an engine with an array of belt driven accessories.

Referring now to FIG. 1, a generalized view of an engine 1 having an array of accessories (represented by their respective pulleys) driven by a V-ribbed belt 2 is presented. The V-ribbed belt 2 is driven by a fixed diameter pulley 3 on the variable diameter pulley assembly 4 which assembly is driven by the flat belt 5. The flat belt 5 is driven by the pulley 6 on the engine crankshaft which supplies all of the accessory power. The flat belt 5 extends around a moveable idler pulley 7 which maintains the tension of the flat belt 5 by the spring means 7a and then to the variable diameter pulley assembly 4 and over a fixed position idler 8 located on the water pump-fan shaft housing, back to the crankshaft pulley 6. The accessories, which are simply shown as exemplary as will be understood by those skilled in the art, include the water-pump and fan 9, air pump 10, alternator 11, and air conditioning compressor 12. A conventional tensioner with idler pulley 13 maintains the tension of the V-ribbed belt 2 operating the forementioned accessories. More particularly, the movable idler 7 is conventionally adapted, in conjunction with representative tension spring means 7a to adjust its position with respect to the variable diameter pulley assembly 4 in order to maintain belt tension within an acceptable range as the effective diameter of the pulley assembly 4 changes.

Figure 2:
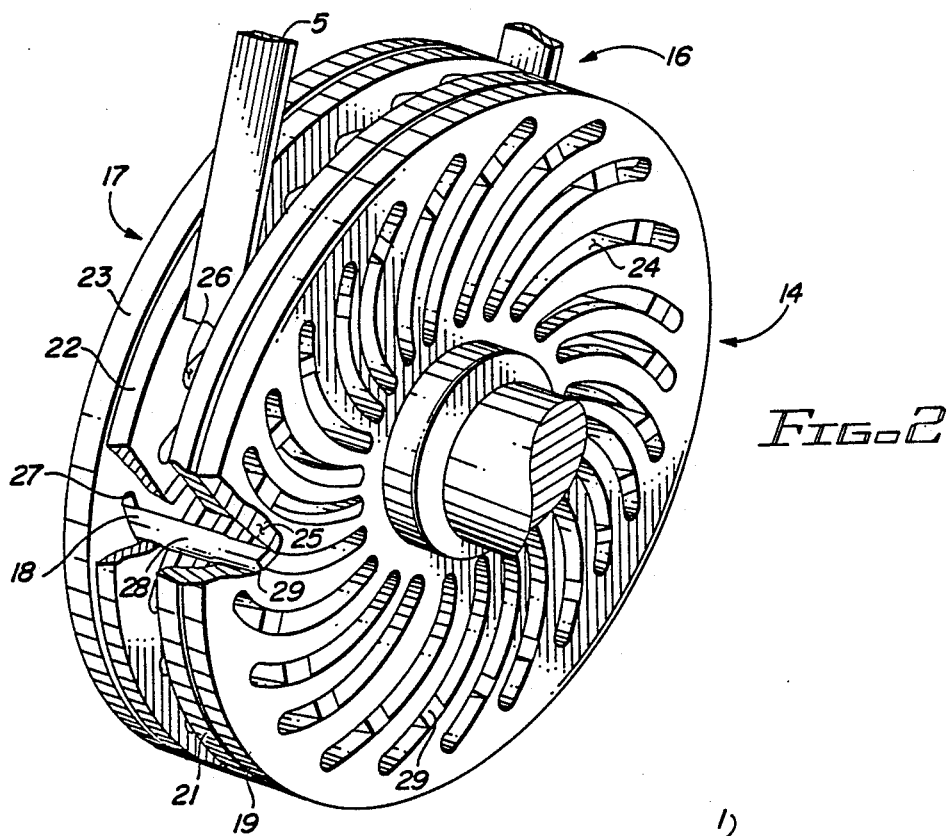
FIG. 2 is a partially cut-away perspective view of a variable diameter pulley assembly which is a key component of the subject system.

Referring now to FIG. 2, fundamental aspects are presented of a flat belt, variable diameter pulley assembly which is a vital component of the subject system. The pulley assembly 14 includes a pair of pulley sheaves 16 and 17 between which there extends a series of belt engaging elements 18, the latter being engaged by a flat belt 5. In one construction, there is a series of twenty-four belt engaging elements 18 equally circumferentially distributed whereby an angle of fifteen degrees is established between runs of the belt 5 coming off tangentially from one belt engaging element 18 as compared to that of an immediately adjacent belt engaging element 18. Each belt engaging element 18 includes a central shank 28, which engages the belt 5 and bearing regions 29 at each end.

Pulley sheave 16 incorporates a pair of pulley guideway disks 19 and 21 which are parallel to and lie immediately adjacent each other in juxtaposition. Similarly pulley sheave 17 incorporates a pair of pulley guideway disks 22 and 23 which are parallel to and lie immediately adjacent each other in juxtaposition. The longitudinal spacing between the pulley sheaves 16 and 17 (i.e., the axial spacing between the inner guideway disks 21 and 22) remains the same irrespective of the radial adjustment of the belt 5 for different accessory driving speeds. This spacing is sufficient to accommodate with clearance the belt engaging elements 18 supporting the belt 5 which is selected to carry the load that the system is designed for as is well understood.

The range of radial adjustment or position of the belt 5 on the pulley assembly 14 is achieved by altering the radial positions of the belt engaging elements 18, and variations in the radial positions of the belt engaging elements 18 are obtained by relative rotation of the outer guideway disk 19 and the inner guideway disk 21 of pulley sheave 16 to change their angular relationship. Similarly, by identical relative rotation of the guideway disks 23, 22, respectively, of pulley sheave 17, change of angular relationship is accomplished As a practical matter, to insure synchronous operation, the inner guideway disks 21 and 22 are physically locked together and the outer guideway disks 19 and 23 are also locked together.

The outer guideway disk 19 has a series of logarithmic spiral guideways 24 therein which progress outwardly from adjacent the center at an angle of forty-five degrees with respect to the pulley assembly radius. Similarly the inner guideway disk 21 has a series of logarithmic spiral guideways 25 radiating outwardly at an angle of forty-five degrees with respect to the pulley assembly radius, but in the opposite sense to the guideways 24 of guideway disk 19. Since the guideways 24 and 25 radiate outwardly at angles of forty-five degrees with respect to the pulley radius, but in opposite senses, the intersections of these guideways exist at ninety degrees at all radial positions. This results in a substantially constant geometry at the intersections of the logarithmic spiral guideways 24 and 25 at all radial positions for receiving the bearing region ends 29 of the belt engaging elements 18. Similarly, the inner guideway disk 22 has a series of logarithmic spiral guideways 26 radiating outwardly identically to the guideways 25 of inner guideway disk 21, and the outer guideway disk 23 includes logarithmic spiral guideways 27 extending outwardly identically to the guideways 24 of outer guideway disk 19. Hence, the guideways 26 and 27 intersect at ninety degrees at all radial positions to give a constant intersection geometry identical to the logarithmic spiral guideways 24 and 25 for receiving the other ends of the belt engaging elements 18.

While forty-five degree spirals have been shown and give ninety degree intersections, it will be understood that logarithmic spirals of other angularities may be used as desired. Also, minor variations from a particular angularity may be tolerated so long as the belt engaging element bearing ends supported at the guideway intersections will move appropriately when the sheaves are rotated relative to each other to change the angular relationship between the inner and outer guideway disks.

The foregoing description of the basic configuration for the pulley assembly 14, the belt 5 and the belt engaging elements 18 is set forth in greater detail in the context of a continuously variable transmission in U.S. Pat. No. 4,295,836, dated Oct. 20, 1981, entitled "Flat Belt Transmission with Rotary Actuator and Integrated Control System" as well as in U.S. Pat. Nos. 4,591,351; 4,714,452; 4,768,996, all of which issued to Emerson L. Kumm.

Attention is now directed to FIG. 3 which is a detailed cross sectional view of a variable diameter pulley assembly 4 which incorporates not only the components discussed in conjunction with FIG. 2, but also an integral spring actuator mechanism 15 for establishing the radial position of belt engaging elements 18 to obtain the variable diameter operation and a fixed diameter pulley 3. Thus, the belt engaging elements 18 are captured at their bearing ends 29 within spiral guideways 24, 27, 25 and 26 respectively, provided in guideway disk set 17 and guideway disk set 16. The outer guideway disk set 19 and 23 is fixed to a main shaft 30 for rotation therewith through pins 31 and the main shaft 30 rotates on a fixed mounting shaft 32 via a ball bearing 33 and roller bearing 34. The mounting shaft 32 is fastened rigidly to the engine using mounting plate 36 and bolts 37.

The spring drive actuator ring 38 of the actuator control mechanism 15, which is directly connected to the inner guideway disk set 21 and 22 in the circumferential region 39, ordinarily also rotates with the main shaft 30 but transiently may shift its angular relationship with the main shaft during operation to consequently cause the angular relationship between the outer guideway disk set 23 and 19 and the inner guideway disk set 22 and 21 to correspondingly change the radial positions of the belt engaging elements 18 in the manner generally discussed above with respect to FIG. 2.

Referring briefly to FIG. 4, it will again be appreciated that the mutual angular relationship between the outer guideway disk set 19 and 23 and the inner guideway disk set 21 and 22 establishes the intersection points of the logarithmic spirals and hence the radial positions at which the ends of the belt engaging elements 18 are captured to effect the instantaneous effective diameter of the pulley assembly.

Referring again to FIG. 3, the fixed diameter pulley 3 driving the V-ribbed belt 2 for the accessories is fastened to the rotating shaft 30 by screws 35. Hence, the speed of the V-ribbed belt 2 varies as the speed of the variable speed pulley 4 changes due to changes in radius of the belt drive elements 18. As previously mentioned, the flat belt 5 drives the variable pulley assembly 4 at speeds that increase with increasing engine speed at a constant belt drive element 18 radial position. However, as the speed of the pulley assembly 4 increases, the centrifugal force of the belt drive elements 18 also increases with the square of the speed exerting a force on the guideway disks tending to cause the belt drive elements to go to a larger radius. As shown in FIG. 1, this is resisted in part by the tensioner spring 7a which gives a higher belt tension as it is elongated by the movement of the idler pulley 7. However, the centrifugal force of the belt drive elements 18 is also either aided or resisted by a spring actuator control mechanism 15 to obtain the desired accessory operating characteristic of lower speeds at high engine speed and higher speeds at low engine speed all relative to the engine speed. Basically, this then gives a more constant accessory operating speed for changes in engine speed.

Figure 5:
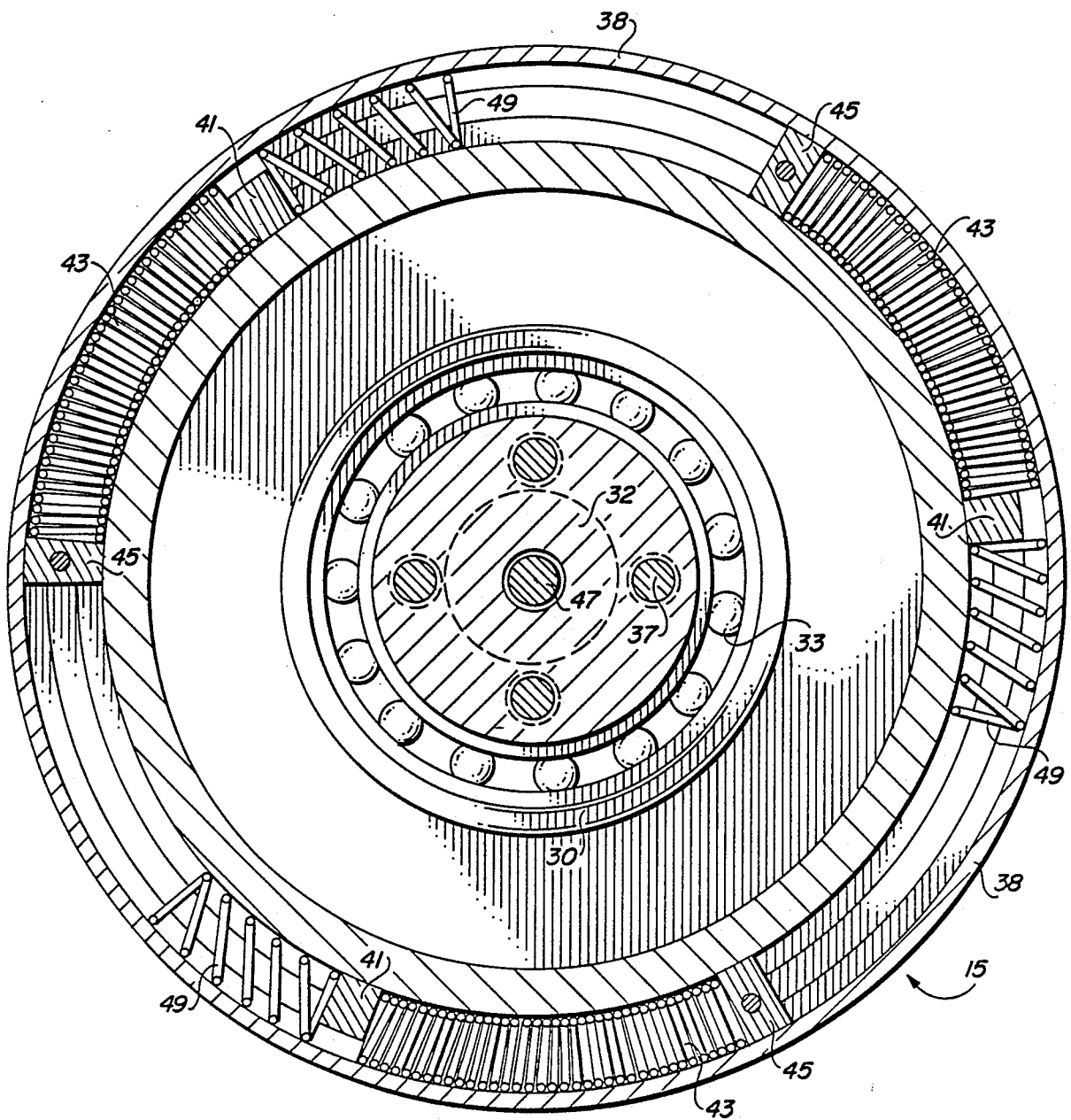
FIG. 5 is a cross sectional view taken along the lines 5—5 of FIG. 3.

Referring now to FIG. 5 in combination with FIG. 3, the details of the spring operated actuator control means 15 may be perceived. An inner spring enclosure and struts 41 is fastened to the outer guideway disk 19 by screws 42. The outer guideway disk 19 rotates with the shaft 30 as previously described. The outer radial strut ends of inner spring enclosure 41 bear on three compression springs 43 which are retained in a circumferential housing 38. Struts 45 are fastened rigidly to the housing 38 and struts 45 also bear on the compression springs 43 but at an end of the springs opposite to that of struts 41. Hence, for example, the clockwise rotation of the housing 38 connected to the inner guideway disks 21 and 22 and struts 45 is resisted by springs 43 supported by the inner spring enclosure struts 41 connected to the outer guideway disks 19 and 23 and hence to the shaft 30 which rotates in a counter clockwise direction as shown in view directions of FIG. 5. The torque resulting from the spring forces—that is compression of springs 43 acts to resist increases in the radius of the belt drive elements 18. The location of the springs 43 near the maximum pulley diameter minimizes the size of spring required for a given torque and when equally spaced does not give an unbalanced pulley while moving through the operational range. The specific spring size used for an application depends on the accessory power requirements versus speed, the belt tension given by the tensioner over the range of radii in the variable pulley, the weight of the belt drive elements and their operating radii as well as belt wrap angles on the pulleys and various other factors well known in the art of designing a flat belt variable speed pulley.

The arrangement shown in FIG. 3 incorporates a center drive shaft 47 keyed to the pulley shaft 30 through a key 48. This makes possible the location of the variable pulley assembly 4 at, for example, the location of the power steering pump since the drive shaft 47 could be used to directly drive the power steering pump (not shown) at the varying speed of pulley 4. This would reduce the power requirements of the belt 2 to the power steering pump and eliminates a separate pulley otherwise needed for the power steering pump.

The above discussion has been involved substantially with the operation of driving accessories other than an engine supercharger. The speed ratio of an engine supercharger requires a more precise and somewhat different tailoring of the speed relationship than normally required for the other accessories as previously discussed. However, the overall speed relationships remain the same—the supercharger is increased in speed ratio relative to the engine at low engine speeds and decreased in speed ratio relative to the engine at high engine speed. Since the supercharger customarily operates at speeds 2 to 3 times the engine speed, the drive pulley 3 for such installation is sized larger than that shown for the accessory drive system and for precision tailoring of the actuator spring forces at low pulley radius in pulley assembly 4, an additional set of shorter counter springs 49 may be employed between struts 41 and 45 of the spring actuator 15 as shown in FIG. 5.

Figure 6:
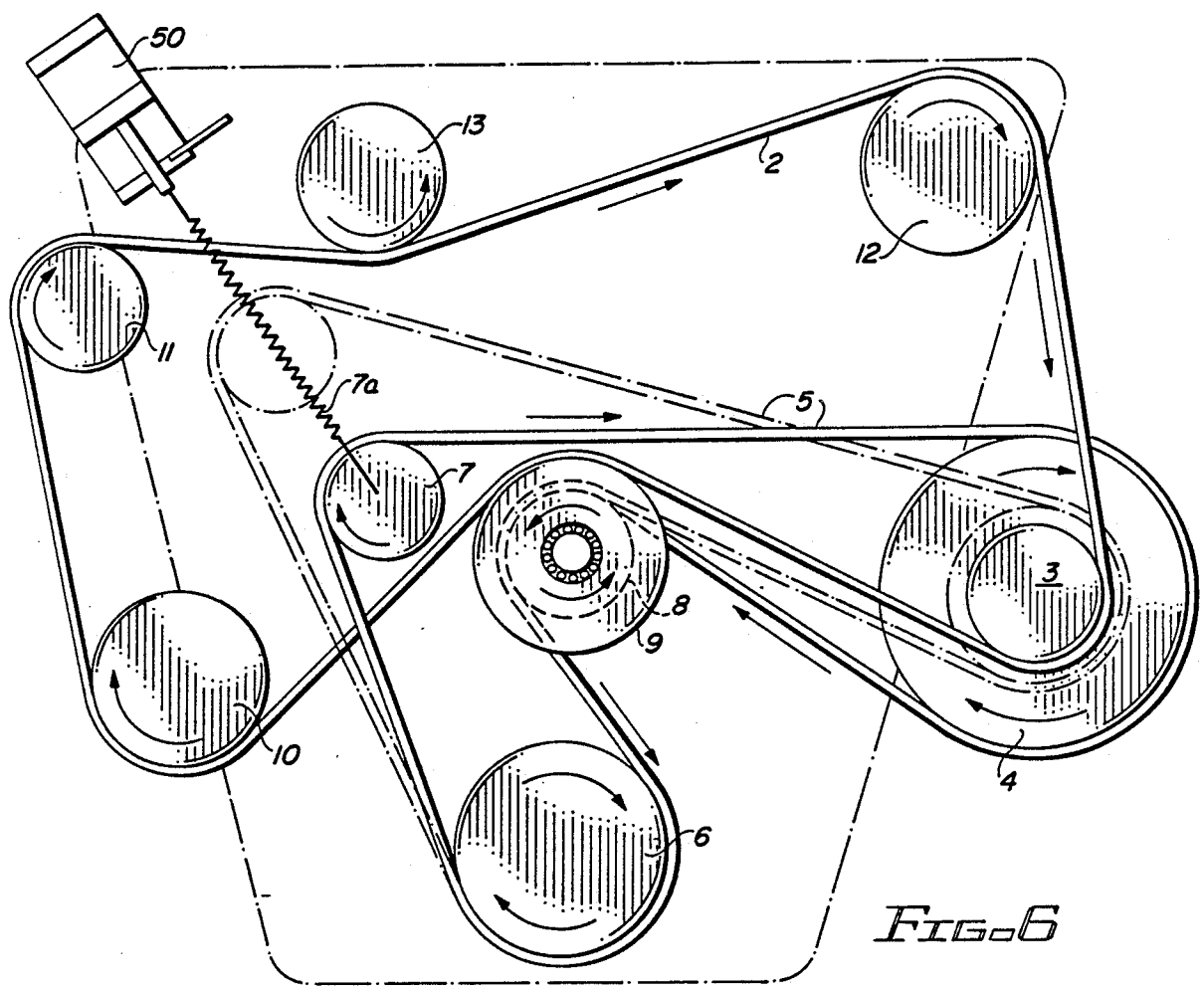
FIG. 6 is a generalized view representing an engine with an array of belt driven accessories using a belt tensioner having a supplemental actuator control.
Figure 7:
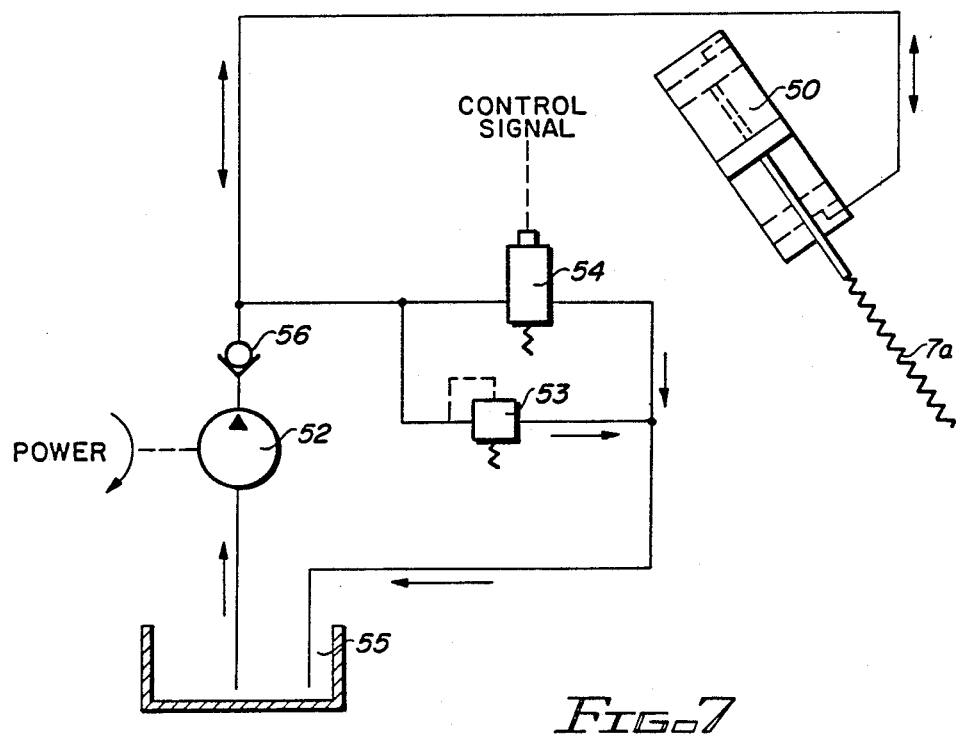
FIG. 7 shows in schematic form the control arrangement using a supplemental actuator on the belt tensioner.

It may be desirable in some cases to modify the automatic control as shown and described herein. An option exists to incorporate an actuator 50 in connection with idler pulley 7 and spring means 7a that changes the speed ratio between the accessories and the engine by increasing or decreasing the preset spring tension thus changing the belt tension as shown schematically in FIG. 6. With the balanced system of FIG. 1 or FIG. 6, modest changes in belt tension reflect in changing the belt radius in the variable pulley assembly 4. A hydraulic actuator 50 is shown in the control schematic of FIG. 7 to vary the tension in the spring means 7a of the idler pulley 7. As shown, pump 52 supplies oil from reservoir 55 to the actuator 50 at a pressure regulated by a pressure control valve 54 as set by a control signal. A pressure relief valve 53 and check valve 56 are conventional required components of a hydraulic system. The control signal could reduce the oil pressure to the actuator 50 when power demand decreases causing the accessories to operate at their minimum speed ratio relative to the engine since the variable pulley assembly 4 would adjust to its maximum radius. Conversely, a high power demand due to, i.e., an increase in air conditioning requirement or low battery voltage, and the like, could give a control signal that increases the oil pressure to the actuator 50 causing the belt tensioner 7 in turn to take up more of belt 5 resulting in a reduced belt radius in the variable pulley assembly 4. This would cause the accessories to operate at a higher speed ratio as desired for the higher power demand.

As previously mentioned, the foregoing discussion has been directed to a system in which it is the driven pulley which is rendered speed responsive variable diameter. However, as also previously mentioned, it is within the purview of the invention to provide variable diameter capability to one or more of the driven pulleys in conjunction with a fixed or variable diameter driving pulley. Also, fixed diameter pulleys may be driven by the same flat belt driving the variable diameter pulley. Further, as previously mentioned, the variable diameter driven pulley may be mounted on the shaft of an accessory, i.e., a power steering pump, to drive said accessory while transmitting power to other accessories. Alternatively, the variable diameter driven pulley with the fixed diameter pulley for driving the accessories may be bearing mounted on a stationary support and yet drive another accessory by a shaft rotating through the stationary support concentric with the variable diameter pulley.

In addition, although the invention has been described in the exemplary environment of an engine driving rotating accessories, those skilled in the art will appreciate that the prime mover need not necessarily be an engine, and other prime mover environments, such as electric motors, are contemplated.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

I claim:

1. A variable speed drive system for prime-mover-driven accessories comprising:

(A) a prime mover having a rotating output pulley;

(B) a pulley affixed to a rotating component of each accessory to be driven by said prime mover, said accessories being arranged such that said accessory pulleys are disposed to be driven in tandem by a belt;

(C) a pulley assembly operably connected to said prime mover rotating output pulley by means of a flat belt, said pulley assembly including:
1. a shaft;
2. a pair of pulley sheaves;
3. a series of belt engaging elements, each said belt engaging element having:
   a. an elongated central shank including a drive surface adapted to be engaged by said flat belt;
   b. a first bearing region at a first end of said central shank; and
   c. a second bearing region at a second end of said central shank;
4. each said pulley sheaves including:
   a. a pair of relatively movable guideway disks lying alongside each other in juxtaposition;
      i. an inner guideway disk of each said pair including a first series of spiral guideways extending in one direction;
      ii. an outer guideway disk of each said pair including a second series of spiral guideways extending in a second direction;
      iii said first and second series of spiral guideways providing intersections for capturing and locating said bearing regions of said belt engaging elements, said intersections providing locations for said bearing regions to establish radial positions of said belt engaging elements with respect to said shaft;
5. means connecting said inner guideway disks of said pulley sheaves together to establish an inner guideway disk set which rotates about the axis of said shaft;
6. means connecting said outer guideway disks of said pulley sheaves together to establish an outer guideway disk set which rotates about the axis of said shaft;
7. means connecting one of said guideway disk sets to said shaft for rotation therewith;
8. means drivingly coupling a fixed diameter output pulley to said shaft;
9. belt means drivingly coupling said fixed diameter output pulley to the accessory pulleys;
10. control means responsive to said pulley assembly speed for varying the angular relationship between said inner guideway disk set and said outer guideway disk set to thereby vary the radial position of said belt engaging elements and thus vary the effective diameter of said pulley assembly; said control means comprising:
    a. a housing connected to said shaft and to one of said guideway disk sets and rotatable therewith;
    b. an inner spring enclosure connected to the other of said guideway disk sets and rotatable therewith;
    c. compression means mounted between said housing and said inner spring enclosure in such a manner that said compression means resists rotation of said housing in one direction and aids rotation of said housing in the counter direction while conversely aiding or resisting the rotation of said inner spring enclosure in the same rotational direction to thereby aid or resist the centrifugal force of said belt engaging elements and control the radial positions of said belt engaging elements; and (D) means for maintaining appropriate tension on said belt as the effective diameter of said pulley assembly varies.

2. The variable speed drive system of claim 1 wherein said housing and said inner spring enclosure are each provided with spaced apart struts which struts bear on said compression means.

3. The variable speed drive system of claim 2 wherein said compression means comprise compression springs and wherein one end of each of said compression springs bears against a housing strut and the opposite end bears against an inner spring enclosure strut.

4. The variable speed drive system of claim 3 wherein said compression springs are equally spaced within said housing and said inner spring enclosure.

5. The variable speed drive system of claim 4 wherein said compression springs are positioned substantially at the maximum diameter of said pulley assembly.

6. The variable speed drive system of claim 1 wherein the belt take up and tensioning means is augmented using an external control signal to change the speed of the accessories relative to the prime mover speed.

* * * * *